(12) United States Patent
Lee

(10) Patent No.: US 10,137,921 B2
(45) Date of Patent: Nov. 27, 2018

(54) ELECTRIC STROLLER

(71) Applicant: Sang Min Lee, Wonju-si (KR)

(72) Inventor: Sang Min Lee, Wonju-si (KR)

( * ) Notice: Subject to any disclaimer, the term of this patent is extended or adjusted under 35 U.S.C. 154(b) by 0 days.

(21) Appl. No.: 15/671,892

(22) Filed: Aug. 8, 2017

(65) Prior Publication Data

US 2018/0043919 A1    Feb. 15, 2018

(30) Foreign Application Priority Data

Aug. 9, 2016 (KR) .......................... 10-2016-0101124

(51) Int. Cl.
*B62B 9/12* (2006.01)
*B62B 5/00* (2006.01)
*B62B 9/20* (2006.01)
*B62B 9/26* (2006.01)

(52) U.S. Cl.
CPC ................. *B62B 9/12* (2013.01); *B62B 5/004* (2013.01); *B62B 9/206* (2013.01); *B62B 9/26* (2013.01)

(58) Field of Classification Search
CPC .. B62B 9/00; B62B 9/102; B62B 9/12; B62B 9/206; B62B 7/14; B62B 7/142; B62B 7/145; B62B 5/004; A63C 17/12; A63C 2203/12

See application file for complete search history.

(56) References Cited

U.S. PATENT DOCUMENTS

| | | | | |
|---|---|---|---|---|
| 3,834,726 A * | 9/1974 | Hobza | ................... | B62B 5/0026 280/32.7 |
| 5,540,296 A * | 7/1996 | Strothmann | ............... | B60L 7/14 180/165 |
| 5,553,885 A * | 9/1996 | Chang | ....................... | B62B 7/08 280/642 |
| 5,803,535 A * | 9/1998 | Jane Cabagnero | .... | A47D 13/02 297/183.3 |
| 5,947,555 A * | 9/1999 | Welsh, Jr. | ............... | B62B 7/142 280/30 |
| 6,086,086 A * | 7/2000 | Hanson | ..................... | A61G 5/00 280/642 |
| 6,360,836 B1 * | 3/2002 | Milano, Jr. | ............. | B62B 5/005 180/65.6 |
| 6,422,634 B2 * | 7/2002 | Lundh | ....................... | B62B 9/28 280/32.7 |
| 6,540,238 B2 * | 4/2003 | Yang | ....................... | A63C 17/01 280/32.7 |
| 6,827,356 B2 * | 12/2004 | Zhuang | ..................... | B62B 9/28 280/304.1 |
| 7,004,272 B1 * | 2/2006 | Brown | ..................... | B60K 1/00 180/65.1 |

(Continued)

FOREIGN PATENT DOCUMENTS

| | | | | |
|---|---|---|---|---|
| DE | 19643806 A1 * | 5/1998 | ............ | B62B 7/142 |
| DE | 102007004704 A1 * | 8/2008 | ............... | B62B 9/28 |
| KR | 20-0474422 Y1 | 9/2014 | | |
| KR | 200474422 Y1 * | 9/2014 | | |
| KR | 10-2016-0003437 A | 1/2016 | | |

*Primary Examiner* — James A Shriver, II
*Assistant Examiner* — Steve Clemmons
(74) *Attorney, Agent, or Firm* — Novick, Kim & Lee, PLLC; Jae Youn Kim

(57) ABSTRACT

The present invention relates to an electric stroller and provides an electric stroller which is enabled to driven a stroller with an electric board and makes the electric board be folded to be kept and moved so as to more effectively use the stroller.

8 Claims, 5 Drawing Sheets

(56) References Cited

U.S. PATENT DOCUMENTS

| | | | | |
|---|---|---|---|---|
| 7,635,037 | B2* | 12/2009 | Treadwell | B62B 5/005 180/19.3 |
| 8,006,786 | B1* | 8/2011 | Chapman | A61G 5/1094 180/65.1 |
| 8,029,007 | B2* | 10/2011 | Jones | B62D 63/00 280/204 |
| 8,033,348 | B1* | 10/2011 | Parkhe | B62B 9/00 180/19.1 |
| 8,657,303 | B2* | 2/2014 | Andrews | B62B 9/28 280/304.1 |
| 8,714,582 | B2* | 5/2014 | Hei | B62B 9/28 280/47.35 |
| 9,321,475 | B2* | 4/2016 | Weber | B62B 9/28 |
| 9,738,300 | B2* | 8/2017 | Georgiev | B62B 9/00 |
| 9,776,069 | B2* | 10/2017 | Mckay | A63C 17/26 |
| 2001/0033069 | A1* | 10/2001 | Ivers | B62B 9/28 280/648 |
| 2003/0209885 | A1* | 11/2003 | Szmidt | B60N 2/2806 280/652 |
| 2005/0029855 | A1* | 2/2005 | Hanson | A61G 5/08 297/440.15 |
| 2005/0279537 | A1* | 12/2005 | Nguyen | B62B 5/005 180/11 |
| 2008/0001370 | A1* | 1/2008 | Cousin | B62B 9/28 280/32.7 |
| 2015/0197264 | A1* | 7/2015 | Fields | A63C 17/1409 180/180 |
| 2016/0327944 | A1* | 11/2016 | Sandbothe | A47D 13/00 |

* cited by examiner

ELECTRIC STROLLER

TECHNICAL FIELD

The present invention relates to an electric stroller, and more particularly, to an electric stroller made so as for a user to more conveniently move a stroller by using an electric board provided in the stroller and simply fold the stroller to more effectively use the stroller.

BACKGROUND ART

In general, a stroller as a means by which infants can be boarded an apparatus that makes it possible for a parent or guardian to move the infants in a simple manner.
Such a conventional stroller has a problem in that it takes a great deal of effort to move the stroller in a situation in which long-distance movement or a lot of load due to the fact that the parent or a manager can not easily provide a configuration for moving the stroller more easily.

A foldable electric baby carriage disclosed in Korean Patent Unexamined Publication No. 10-2016-0003437 has a problem in that the foldable electric baby carriage cannot provide a configuration that facilitates keeping by simply folding a first boarding body including a power source which is electrically driven when the foldable electric baby carriage is not used.

A baby stroller attached electric moving device capable of controlling the speed without using hands disclosed in Korean Utility Model Registration No. 20-0474422 has a problem in that the baby stroller cannot provide a configuration to simply keep a driving apparatus in a folding manner.

DISCLOSURE

Technical Problem

The present invention is contrived to solve the problem and has been made in an effort to provide an electric stroller in which an electric board provided in a stroller is provided to be rotatably folded to reduce a volume when a user more simply keeps and moves the electric stroller.

Further, the present invention has been made in an effort to provide an electric stroller to be driven by substituting power of the electric stroller with manpower when the power of the electric stroller is fully consumed.

The technical object of the present invention are not limited to the aforementioned technical objects, and other technical objects, which are not mentioned above, will be apparently appreciated by a person having ordinary skill in the art from the following description.

Technical Solution

In order to achieve an object of the present invention, an electric stroller according to an aspect of the present invention includes: a stroller body part; a stroller saddle part detached from or attached to the stroller body part; and an electric board connected with the body part, and the electric board is provided to rotatably move based on the body part.

Advantageous Effects

According to the present invention, an electric board capable of automatically driving a stroller is provided, and as a result, a user can automatically (electrically) drive the stroller and the electric board is simply folded to enable keeping and moving the electric board when the electric board is not used to reduce a volume of the electric stroller, thereby enabling a public transportation such as a subway to be used.

In addition, when power of the electric stroller is fully exhausted, the electric board can be provided in a board type so as to drive the electric stroller with manpower of the user, and as a result, even when the power is exhausted, the electric stroller can be used.

Further, it is advantageous to provide a structure that can prevent a saddle portion of the stroller from being arbitrarily detached, thereby making it possible to use the electric stroller more safely.

Meanwhile, there is an effect of making it possible to use the electric stroller even when the user carries a luggage by providing a storage unit for simply storing user's goods.

In addition, a structure that simplifies an operation of the electric stroller is provided (a configuration divided into a left handle and a right handle and to enable simple boarding using the electric board) to make it possible to operate the electric stroller more easily than the conventional strollers.

MODE FOR INVENTION

Figure 1:
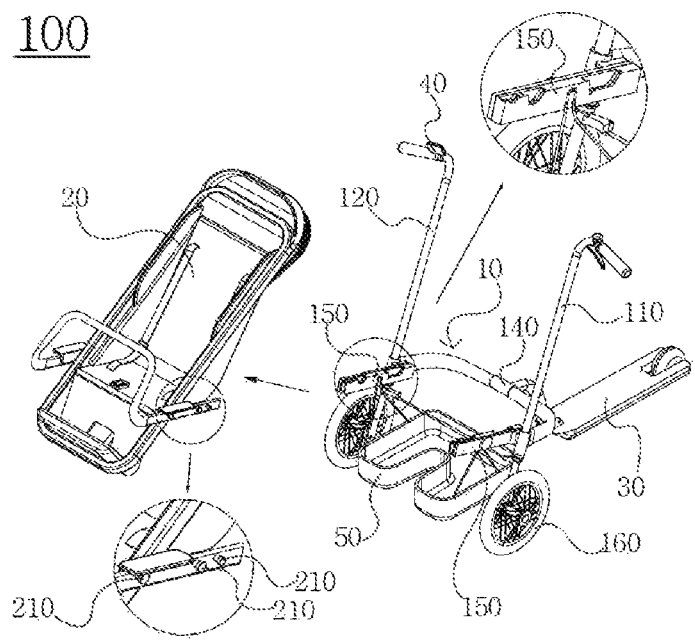
FIG. 1 is an exploded perspective view illustrating an electric stroller according to an embodiment of the present invention.

Hereinafter, an embodiment of the present invention will be described in detail with reference to the accompanying drawings. In this process, sizes or shapes of constituent elements illustrated in the drawings, and the like may be exaggerated for clarity and ease of description. Further, terms which are particularly defined in consideration of a configuration and an action of the present invention may vary depending on the intention or custom of a user or an operator. Definitions of the terms need to be described based on contents throughout this specification. In addition, the spirit of the present invention is not limited to the presented embodiment and those skilled in the art, which appreciate the spirit of the present invention may easily execute another embodiment within a range of the same spirit, but this also belongs to the scope of the present invention, of course.

FIG. 1 is an exploded perspective view illustrating an electric stroller 100 according to an embodiment of the present invention. Hereinafter, the electric stroller 100 will be described based on FIG. 1 and components not illustrated in FIG. 1 will be illustrated through a separate reference drawing.

The electric stroller 100 according to an aspect of the present invention is constituted by a body part 10, a saddle part 20, and an electric board 30.

Figure 3:
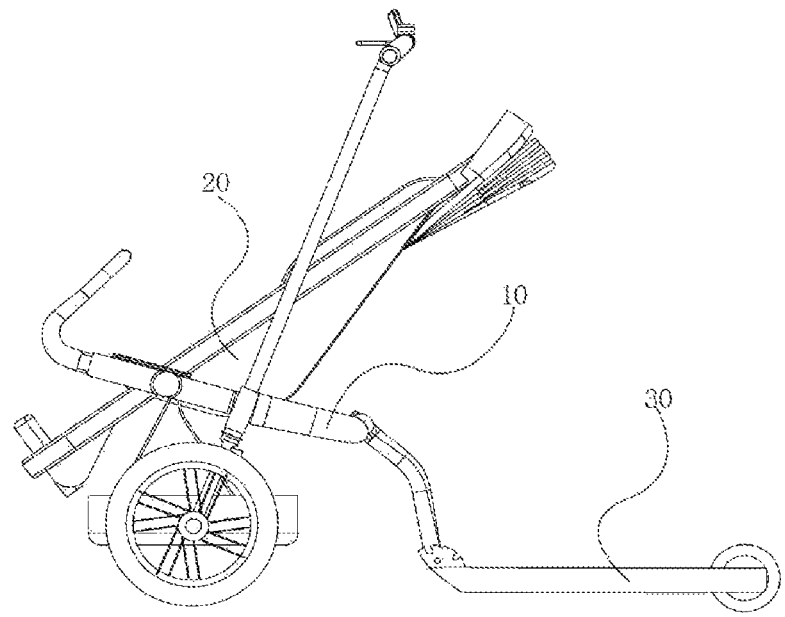
FIG. 3 is a side view illustrating the electric stroller according to the embodiment of the present invention.
Figure 5:
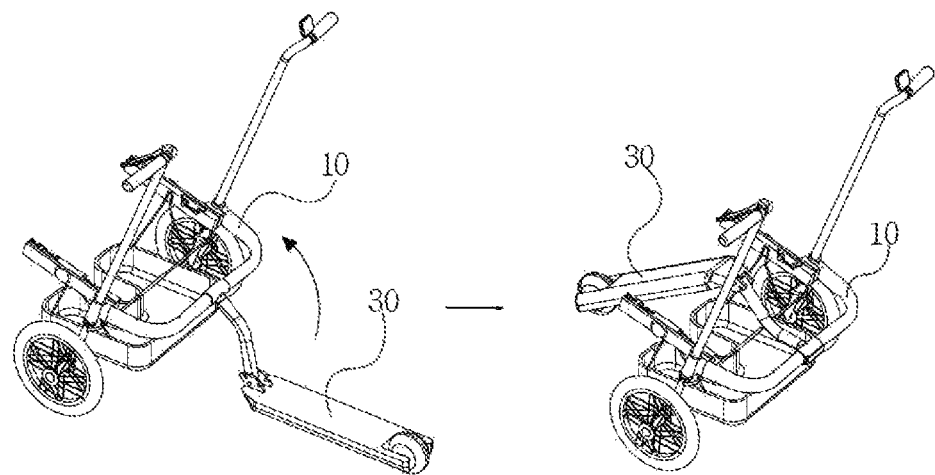
FIG. 5 is a perspective view illustrating a process of removing a saddle portion of the electric stroller and rotatably moving an electric board according to the embodiment of the present invention.
Figure 6:
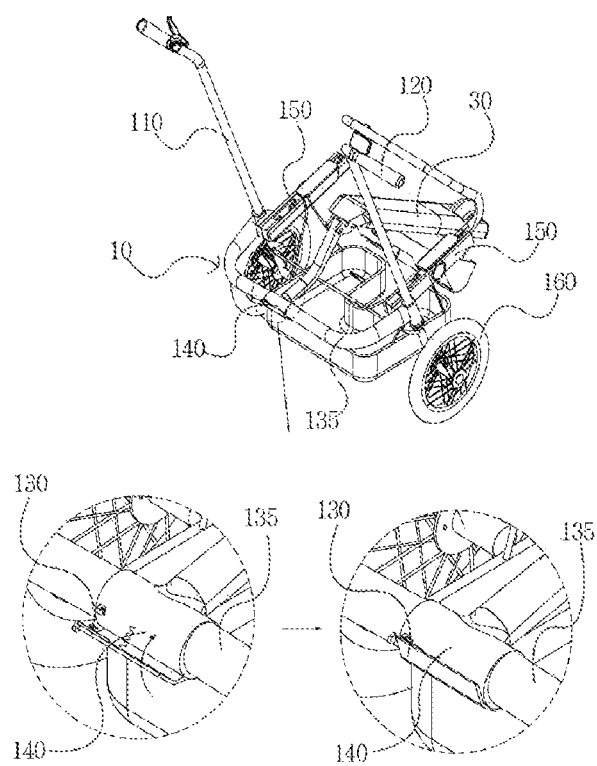
FIG. 6 is an enlarged perspective view illustrating a fastening process of a rotational member and a fixation unit of the electric board according to the embodiment of the present invention.
Figure 7:
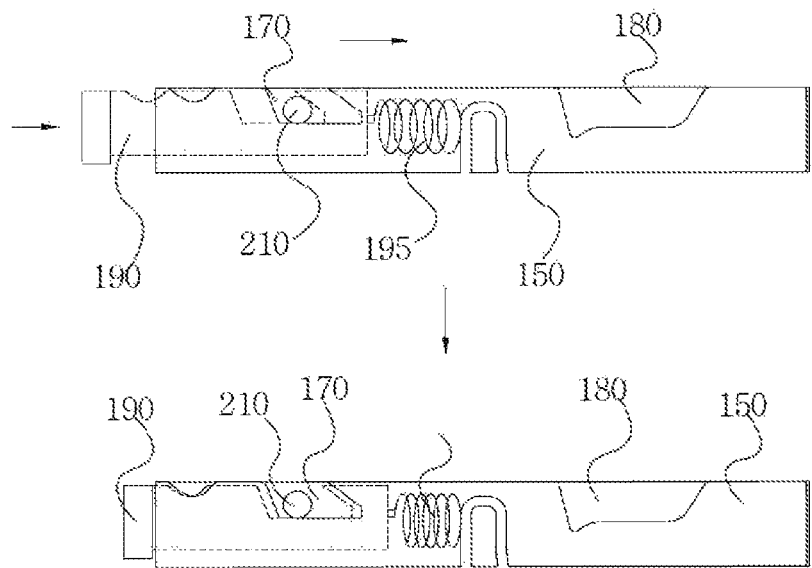
FIG. 7 is a side view illustrating a pressing process of a holding unit having a pressing member and an elastic unit according to the exemplary embodiment of the present invention.
Figure 8:
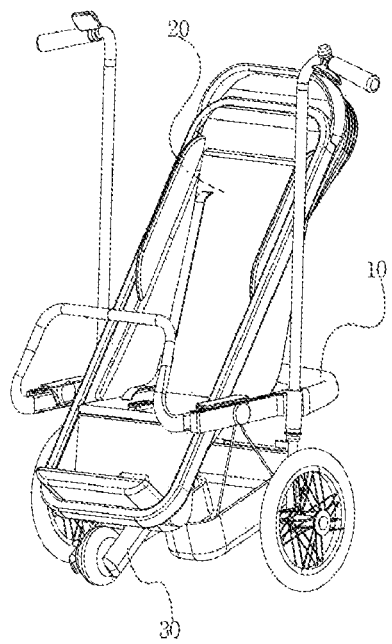
FIG. 8 is a perspective view illustrating an electric stroller in which the saddle portion is fastened while the electric board rotatably moves according to the embodiment of the present invention.

In an aspect of the present invention, the body part 10 as the body part 10 of the stroller is provided so that the saddle part 20 of the stroller is positioned and is connected with the electric board 30 to move the electric stroller 100 by using the electric board 30. In detail, the body part 10 may be configured to include a left handle 110 and a right handle 120, a frame 135 connected with the left handle 110 and the right handle 120, a rotation member 150 provided in the frame 135 and rotating the electric board 30, a fixation unit 130 fixing the rotational member 140, a saddle part holding unit 150 provided in the frame 135 and fixing the saddle part 20, and a moving means 160 provided in a lower part of the frame 135. The body part 10 makes the saddle part 20 to be detached or attached and includes a handle divided into the left handle 110 and the right handle 120 to prevent rotational movement from being restricted by the handle when the electric board 30 rotatably moves, thereby reducing a volume so as to simply fold, keep, and move the electric board 30 when the electric board 30 is not used. Further, the electric stroller 100 is more simply controlled (operated) by using the configuration divided into the left handle 110 and the right handle 120 to make females or the old and the weak more easily control the electric stroller 100. The electric stroller 100 is not particularly limited thereto, but the frame 135 may have a "C" like shape. The frame 135 has an advantage to provide a space where the saddle part 20 may be positioned. The rotational member 140 is provided to rotatably move the electric board 30 along the frame 135 in connection with the frame 135. Referring to FIG. 3, the rotational member 140 has a reversed "L" like shape to connect the frame 135 and the electric board 30. The fixation unit 130 may be provided in the rotational member 140 and is provided to prevent the electric board 30 from arbitrarily moving by fixing the rotational member 140. Referring to FIG. 6, when the fixation unit 130 is provided in a latch shape to release a latch, the rotational member 140 may be provided to rotate and more particularly, when one end connected with the rotational member 140 and the frame 135 is provided in a "C" shape (since the fixation unit 130 is not completely closely attached and a space is available, the rotational member may rotatably move along the frame) and the rotational member 140 and the frame 135 are connected by using the fixation unit 130, the fixation unit 130 is formed in a "O" shape (the fixation unit 130 is completely closely attached to the frame, and as a result, the frame and the rotational member are fixed), and as a result, the frame 135 and the rotational member 140 may be provided to be fixed, but is not particularly limited thereto. That is, the rotational member 140 is just fixed with the latch, but the rotational member 140 may be more efficiently fixed by using a method of fixing the rotational member 140 by restricting the rotatable movement of the rotational member 140 with friction force (alternatively, pressure) generated by closely attaching one end of the rotational member 140 to the frame 135. Referring to FIGS. 1 and 7, the holding unit 150 is provided in the frame 135 to hold the saddle part 20, thereby preventing movement of the electric board 30 from being restricted due to the saddle part 20 when the electric board 30 rotatably moves. Two movement means 160 may be provided on both sides (left and right) and in this case, there is a problem in that the stroller tilts forward or backward, and as a result, the stroller falls down, but referring to FIGS. 3, 5, and 8, the present invention may prevent the problem by using the electric board 30 and even when the volume is reduced by rotatably moving the electric board 30 to the front of the electric stroller 100, the present invention may support the electric stroller 100 to more simply use the electric stroller 100.

Figure 2:
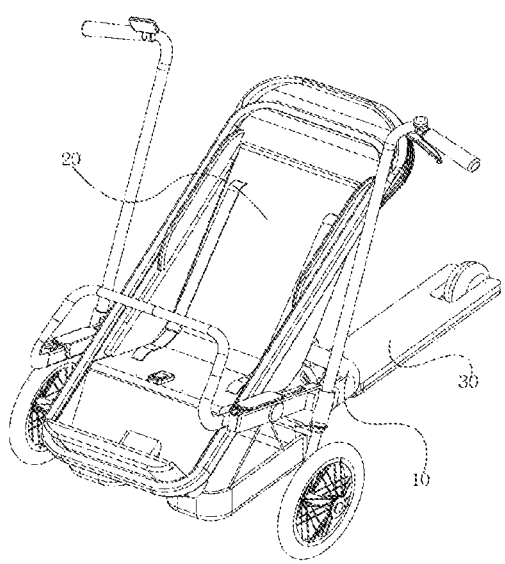
FIG. 2 is a perspective view illustrating the electric stroller according to the embodiment of the present invention.

Referring to FIGS. 1 and 2, the saddle part 20 is provided to be detached from or attached to the stroller body part 10. The saddle part 20 is provided so that infants or children board the saddle part 20. In detail, referring to FIGS. 1 and 7, the saddle part 20 includes three protrusions 210 on both sides, a saddle part holding units 150 includes a pair of front groove 170 and rear groove 180 having different lengths, and the protrusions 210 are positioned at the front groove 170 and the rear groove 180 to fix the saddle part 20 to the holding unit 150. More specifically, the protrusions 210 are disposed so that one protrusion 210 is fastened to the front groove 170 and two protrusions 210 are fastened to the rear groove 180. The protrusions 210 may more effectively support the saddle part 20 to more stably use the electric stroller 100.

Figure 4:
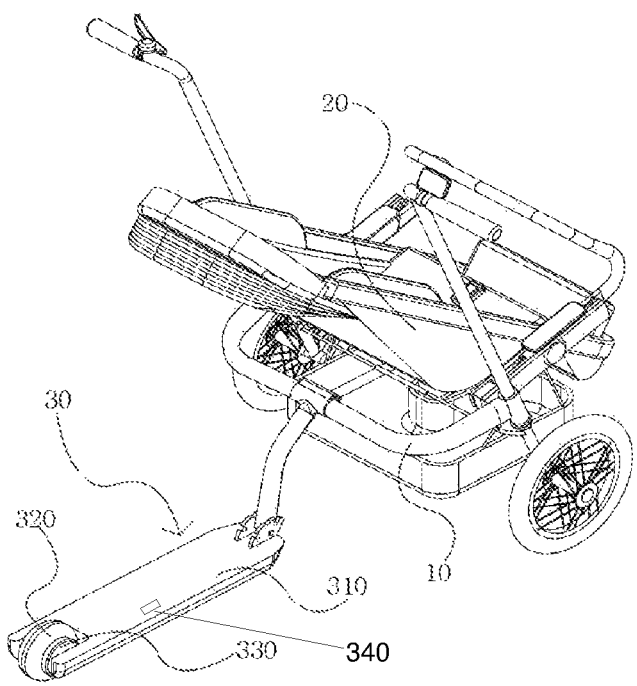
FIG. 4 is a perspective view illustrating the electric stroller according to the embodiment of the present invention at a different angle.

The electric board 30 is connected with the body part 10. The electric board 30 as a means that enables the electric stroller to be automatically driven by using power provides a structure to enable the electric stroller to be used even when the power is fully consumed as compared with the electric stroller 100 in the related art. In detail, referring to FIG. 4, the electric board 30 is configured to include a bar-shaped board (skate board) 310 of which one end is connected with the body part 10, a wheel 320 provided at the other end of the board 310, a motor 330 provided in the wheel 320 and rotating the wheel 320, and a power supply unit 340 provided in the board 310 and supplying power to the motor 330. In more detail, referring to FIG. 5, one end of the board 310 may be provided so that the board 310 rotates together along the rotational member 140 in connection with the rotational member 140. The electric board 30 is provided to rotatably move based on the body part 10 to be folded and kept or folded and moved when not being used. The electric board 30 provides power to automatically move the electric stroller 100 to allow the user to more conveniently use the electric board 100 when driving the electric stroller 100 and the electric board 30 may be simply folded to be kept and moved when not being used, and the product in the related art may not be used when the power is fully consumed, but in the present invention, even when the power is consumed, the electric stroller 100 may be manually moved in the same manner as a quick board, thereby more efficiently using the electric stroller 100.

In another aspect of the present invention, referring to FIG. 7, a pressing member 190 is provided at a front groove 170 to prevent the protrusion 210 from being separated to the outside and the pressing member 190 is configured to further include an elastic part 195 provided at one end of the pressing member 190 and when the other end of the pressing member 190 is pressed, the pressing member 190 moves to move the protrusion 210 to the outside (in an upper direction) of the front groove 170. That is, when the protrusion 210 is pressed by using the other end of the pressing member 190, a groove of the front groove 170 is opened to move the protrusion 210 to the outside. When the user detaches/attaches the saddle part 20, the protrusion 210 is made to be separated from the front groove 170 by pressing the pressing member 190 to detach/attach the saddle part 20 from/from the body part 10. The pressing member 190 has an advantage in that the pressing member 190 makes the electric stroller 100 be more safely used by preventing the saddle part 20 from being arbitrarily separated to the outside at the time of joining the saddle part 20 and the body part 10 and since the saddle part 20 may be detached/attached only by simply pressing the pressing member 190, the pressing member 190 has an advantage in that the pressing member 190 makes even weak women or the elderly easily use the electric stroller 100.

In another aspect of the present invention, referring to FIG. 10, an input unit 40 is provided in the left handle 110 or the right handle 120. The input unit 40 is provided to perform an input for controlling the electric board 30. The input unit 40 includes one or more switches to perform inputs including on or off, a speed, and the like of the power. Further, the input unit 40 may be formed to include an output unit (not illustrated) together and is not particularly limited thereto, but the input unit 40 may be configured to be provided as a touch screen to simultaneously perform the input and the output.

In another aspect of the present invention, the electric stroller 100 may be configured to further include a USB terminal (not illustrated) and a mobile terminal holding cradle (not illustrated). The USB terminal is provided to charge the mobile terminal of the user or transmit data. In a modern society, in the case of the mobile terminal, a means for additionally charging the battery of the mobile terminal as an essential product is provided in the electric stroller 100, which may additionally charge the mobile terminal to make the user charge the mobile terminal without having a separate auxiliary battery and makes the user more conveniently use the electric baby stroller 100, and make it possible to communicate data such as information such as a movement distance, program upgrade, etc. through the terminal. When the mobile terminal is used as a navigation, the cradle makes the user more simply use the mobile terminal by fixing the mobile terminal to the left handle 110 or the right handle 120 and it is possible to more safely drive the electric stroller 100 by using both hands, and as a result, the mobile terminal may be simply verified while driving the electric stroller 100, thereby more safely using the electric stroller 100. The cradle may be provided in a clip shape (alternatively, a vise shape) so as to fix the mobile terminal, but is not particularly limited thereto.

In another aspect of the present invention, a storage unit 50 is provided below the frame 135 to store an article. The storage unit 50 is capable of simply storing baby articles or shopping articles, etc. to make it possible to carry out caring and shopping of a child at the same time, thereby making it possible to use the electric stroller 100 more efficiently.

Figure 9:
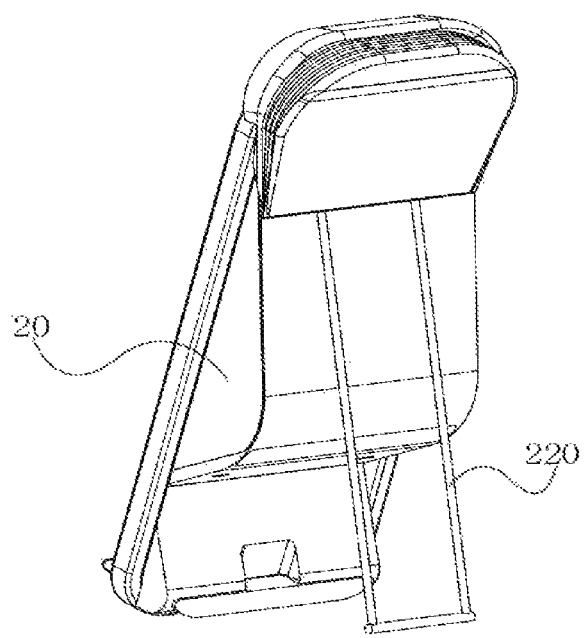
FIG. 9 is a perspective view illustrating the saddle portion including a support unit according to the embodiment of the present invention.

In another aspect of the present invention, referring to FIG. 9, a support unit 220 is provided in the saddle part 20. When the saddle part 20 is separated from the support unit 220, the support unit 220 supports (holds up) the saddle part 20 to prevent the saddle part 20 from falling. When the saddle part 20 is separately positioned while being separated from the electric stroller 100, since a configuration which keeps a balance does not exist, the saddle part 20 falls, and as a result, a safety accident may occur, but in the present invention, there is an advantage in that the support unit 220 is provided to more safely use the saddle part 20 by preventing the saddle part 20 from falling. The present invention is not particularly limited thereto, but the support unit 220 is provided in a "C" like shape to support the saddle part 20. In more detail, the support unit 220 is provided on a rear surface of the saddle part 20 and supports the rear surface of the saddle part 20 and a ground surface to support the saddle part 20 not to fall.

It is apparent to those skilled in the art that the present invention may be embodied in other specific forms without departing from the spirit or essential characteristics of the present invention.

SEQUENCE LIST TEXT

10: Body part
20: Saddle part
30: Electric board
40: Input unit
50: Storage unit
100: Electric stroller
110: Left handle
120: Right handle
130: Fixation unit
135: Frame
140: Rotational member
150: Holding unit
160: Moving means
170: Front groove
180: Rear groove
190: Pressing member
195: Elastic part
210: Protrusion
220: Support unit
310: Board
320: Wheel
330: Motor
340: Power supply unit

The invention claimed is:
1. An electric stroller, comprising:
a stroller body part;
a stroller saddle part detachably attached to the stroller body part;
a left handle and a right handle;
a frame connected with the left handle and the right handle;
a holding unit connected to the frame and configured to fix the saddle part; and
an electric board connected with the body part,
wherein the electric board is provided to rotatably move upon the body part,
wherein the saddle part includes a first and a second protrusions disposed on a lateral surface thereof, and
wherein the holding unit includes:
a front groove and a rear groove having a longer length than that of the front groove;
a pressing member disposed in a front portion of the holding unit and having a front end, a rear end and an upper groove; and
an elastic part connected to the rear end of the pressing member such that the pressing member is configured to be movable inside the front portion of the holding unit in a front and rear directions of the holding unit, the upper groove of the pressing member is overlapped with the front groove, and the first protrusion is configured to be positioned at the front groove and the upper groove of the pressing member at a same time, and the second protrusion is configured to be positioned at the rear groove to fix the saddle part to the body part,
wherein the front groove is configured to be substantially closed by the pressing member when the first protru- sion is locked in the upper groove of the pressing member to fix the saddle part to the body part, and is configured to be open when the front end of the pressing member is pressed in a rear direction of the holding unit to release the first protrusion from the upper groove and the front groove.

2. The electric stroller of claim 1, wherein the stroller body part includes
   a rotational member provided in the frame and rotatably moving the electric board,
   a fixation unit fixing the rotational member, and
   a moving wheel provided below the frame, and
   wherein the stroller body part is provided so as for a user to change a direction by using the left handle and the right handle.

3. The electric stroller of claim 2, wherein the saddle part further includes a third protrusion disposed on the lateral surface thereof, and wherein the third protrusion is configured to be positioned at the rear groove of the holding unit to fix the saddle part to the body part.

4. The electric stroller of claim 2, further comprising:
   an input unit provided in the left handle or the right handle,
   wherein the input unit is provided to perform an input for controlling the electric board.

5. The electric stroller of claim 4, further comprising:
   a USB terminal provided in the input unit; and
   a mobile terminal cradle provided in the left handle or the right handle,
   wherein the USB terminal is provided to charge the mobile terminal of the user or transmit data.

6. The electric stroller of claim 2, further comprising:
   an article storing unit provided below the frame.

7. The electric stroller of claim 1, wherein the electric board includes
   a bar-shaped board of which one end is connected with the body part,
   a wheel provided at another end of the board,
   a motor provided in the wheel and rotating the wheel, and
   a power supply unit provided in the board and supplying power to the motor.

8. The electric stroller of claim 1, further comprising:
   a support unit provided in the saddle part,
   wherein when the saddle part is separated from the support unit, the support unit supports the saddle part to prevent the saddle part from falling.

* * * * *